US012110856B2

(12) United States Patent
Izzo et al.

(10) Patent No.: US 12,110,856 B2
(45) Date of Patent: Oct. 8, 2024

(54) FILTER FOR A FLUID INJECTION VALVE AND A FLUID INJECTION VALVE

(71) Applicant: Vitesco Technologies GmbH, Hannover (DE)

(72) Inventors: Ivano Izzo, Pisa (IT); Fabio Pacchini, Rosignano Solvay (IT); Filippo Falaschi, Fauglia (IT)

(73) Assignee: VITESCO TECHNOLOGIES GMBH, Hannover (DE)

( * ) Notice: Subject to any disclaimer, the term of this patent is extended or adjusted under 35 U.S.C. 154(b) by 308 days.

(21) Appl. No.: 17/281,956

(22) PCT Filed: Oct. 2, 2018

(86) PCT No.: PCT/EP2018/076756

§ 371 (c)(1),
(2) Date: Mar. 31, 2021

(87) PCT Pub. No.: WO2020/069726

PCT Pub. Date: Apr. 9, 2020

(65) Prior Publication Data

US 2021/0355899 A1 Nov. 18, 2021

(51) Int. Cl.
*F02M 61/16* (2006.01)
*F02M 61/10* (2006.01)
*F02M 63/00* (2006.01)

(52) U.S. Cl.
CPC .......... *F02M 61/165* (2013.01); *F02M 61/10* (2013.01); *F02M 61/166* (2013.01);
(Continued)

(58) Field of Classification Search
CPC .... F02M 61/165; F02M 61/10; F02M 61/166; F02M 2200/27; F02M 2200/8061;
(Continued)

(56) References Cited

U.S. PATENT DOCUMENTS 6,328,232 B1 12/2001 Haltiner ...................... 239/585.1
7,070,127 B2 * 7/2006 Maier ................ F02M 51/0671
239/585.4
(Continued)

FOREIGN PATENT DOCUMENTS

CN 1455847 A 11/2003 ............. F02M 51/06
CN 105917111 A 8/2016 ............. F02M 61/16
(Continued)

OTHER PUBLICATIONS

Chinese Office Action, Application No. 201880098404.5, 16 pages, Mar. 2, 2022.

(Continued)

*Primary Examiner* — Christopher R Dandridge

(74) *Attorney, Agent, or Firm* — Slayden Grubert Beard PLLC

(57) ABSTRACT

Various embodiments include an adjusting filter for a fluid injector valve comprising: an elongate filter sleeve having an inlet and an outlet; and a filter insert. The filter sleeve includes a filter accepting section at the inlet, a press-fit section, a centring section at the outlet, and a spring engaging surface surrounding the outlet. The press-fit section is arranged between the filter accepting section and the centring section. The filter insert is arranged in the filter accepting section. The filter accepting section has an outer diameter smaller than an outer diameter of the press-fit section. The centring section has an outer diameter smaller than the outer diameter of the press-fit section.

15 Claims, 4 Drawing Sheets

(52) U.S. Cl.
CPC ..... *F02M 63/0017* (2013.01); *F02M 2200/27* (2013.01); *F02M 2200/8061* (2013.01); *F02M 2200/8084* (2013.01); *F02M 2200/9053* (2013.01)

(58) Field of Classification Search
CPC ... F02M 2200/8084; F02M 2200/9053; F02M 63/0017; F02M 37/48; F02M 19/066
USPC .......................................................... 239/575
See application file for complete search history.

(56) References Cited

U.S. PATENT DOCUMENTS

| | | | | |
|---|---|---|---|---|
| 9,885,332 | B2 | 2/2018 | Izzo et al. | |
| 2003/0052052 | A1 | 3/2003 | Boast et al. | 210/429 |
| 2003/0052252 | A1 | 3/2003 | Sugiyama | 250/208.1 |
| 2003/0155445 | A1 | 8/2003 | Maier et al. | 239/585.1 |
| 2016/0108878 | A1 * | 4/2016 | Falaschi | B01D 35/02<br>239/584 |
| 2017/0234284 | A1 * | 8/2017 | Cavanagh | F02M 61/165<br>239/574 |

FOREIGN PATENT DOCUMENTS

| | | | | |
|---|---|---|---|---|
| DE | 10 2013 225 817 | | 6/2015 | F02M 61/16 |
| DE | 10 2015 226 528 | | 6/2017 | F02M 16/16 |
| EP | 1918576 | A2 * | 5/2008 | B01D 29/33 |
| EP | 2 426 351 | | 3/2012 | F02M 61/16 |
| EP | 3 034 857 | | 6/2016 | F02M 61/16 |
| JP | 2002 130088 | | 5/2002 | F02M 69/00 |
| JP | 2009 174423 | | 8/2009 | F02M 16/16 |
| WO | 2018/024714 | A1 | 2/2018 | F02M 51/06 |

OTHER PUBLICATIONS

Search Report for International Application No. PCT/EP2018/076756, 10 pages, May 20, 2019.

Chinese Office Action, Application No. 201880098404.5, 16 pages, Dec. 2, 2022.

Chinese Grant Notification, Application No. 201880098404.5, 8 pages, Apr. 28, 2023.

* cited by examiner

FILTER FOR A FLUID INJECTION VALVE AND A FLUID INJECTION VALVE

CROSS-REFERENCE TO RELATED APPLICATIONS

This application is a U.S. National Stage Application of International Application No. PCT/EP2018/076756 filed Oct. 2, 2018, the contents of which are hereby incorporated by reference in their entirety.

TECHNICAL FIELD

The present disclosure relates to valves. Various embodiments of the teachings herein include adjusting filters for a fluid injection valve and/or fluid injection valves.

BACKGROUND

Fluid injection valves are in widespread use, in particular for internal combustion engines where they may be arranged in order to dose fluid in the form of fuel into an intake manifold of the internal combustion engine or directly into the combustion chamber of a cylinder of the internal combustion engine. Fluid injection valves are manufactured in various forms in order to satisfy the varying needs of various combustion engines. For example, the length, diameter, and the various elements of the injection valve that are responsible for the way the fluid is dosed may vary. The fluid injection valves may also accommodate an actuator for actuating a needle of the injection valve. The actuator may be an electromagnetic actuator or a piezoelectric actuator, for example.

In order to enhance the combustion process and reduce unwanted emissions, the injection valve may be adapted to dose fluids under high pressures. For example, the pressures may be around 250 bar, around 350 bar, around 500 bar or around 800 bar, in case of different types of gasoline engines and around 2000 bar, in case of a diesel engine.

A fuel injection valve commonly includes a fuel filter for filtering the fuel to keep possible impurities in the fuel away from the needle and the injection nozzle and an adjusting member for adjusting the maximal calibration spring load of the injection valve. A so-called adjusting fuel filter assembly including multiple parts may be used to provide both a filtering function and an adjusting function for adjusting the maximal calibration spring load of the injection valve. International patent application WO 2014/195064 A1 describes an example of a fuel injector valve including a fuel filter assembly. However, manufacturing and assembling such an adjusting fuel filter assembly is rather complicated, and therefore expensive.

SUMMARY

It is, therefore, desirable to provide an adjusting fluid filter for an injection valve and an injection valve which is simple to manufacture and which is simple to assemble into the injection valve. For example, some embodiments of the teachings herein include an adjusting filter (102', 102") for a fluid injector valve (100), comprising: an elongate filter sleeve (122) having an inlet (124) and an outlet (126), the filter sleeve (122) being shaped to provide a filter accepting section (130) having the inlet (124), a press-fit section (132) and a centring section (134) having the outlet (126) and a spring engaging surface (136) surrounding the outlet, wherein the press-fit section (132) is arranged between the filter accepting section (130) and the centring section (134), and a filter insert (142) arranged in the filter accepting section (130), wherein the filter accepting section (130) has an outer diameter that is smaller than an outer diameter of the press-fit section (132) and the centring section (134) has an outer diameter that is smaller than the outer diameter of the press-fit section (132).

In some embodiments, the filter insert (142) comprises metal mesh (144).

In some embodiments, the filter insert (142) comprises at least one metal mesh layer (152) comprising a first mesh size and at least one metal mesh layer (150) comprising a second mesh size, the second mesh size being smaller than the first mesh size.

In some embodiments, the filter insert (142) comprises a filtering mesh (150) positioned between first and second protective meshes (152, 154), the filtering mesh (150) having smaller openings than the first and second protective meshes (152, 154).

In some embodiments, the filter insert (142) comprises porous metal, metal sponge or compacted wire.

In some embodiments, the filter insert (142) is engaged with an inner surface (146) of the filter accepting section (130) by a press-fit connection.

In some embodiments, there are one or more protrusions (148) on an inner surface (146) of the filter accepting section (130) of the filter sleeve (122).

In some embodiments, the filter insert (142) is engaged with the inner surface (146) of the filter accepting section (130) by a press-fit connection between the filter insert (142) and the protrusions (148).

In some embodiments, the filter insert (142) is welded to an inner surface (146) of the filter accepting section (130).

In some embodiments, the filter sleeve (122) and the filter insert (142) is made of stainless steel.

In some embodiments, the press-fit section (132) has a length $L_1$ and the centring section (134) has a length $L_2$, wherein $L_1/2\ L_2 \leq L_1$.

In some embodiments, there are: a valve body (104); a valve needle (112), and an actuator assembly (114) for actuating the valve needle (112), wherein at least a part of the press-fit section (132) of the filter sleeve (122) is engaged with the inner surface of the valve body (104) by a press-fit connection.

In some embodiments, the actuator assembly comprises an electromagnetic actuator (114) comprising a magnetic pole piece (116) and an energizable coil (118), wherein the press-fit section (132) of the filter sleeve (122) is engaged with an inner surface of the pole piece (116) by a press-fit connection.

In some embodiments, there is a calibration spring (120), wherein one end of the calibration spring (120) is in contact with the spring-engaging surface (136) of the filter sleeve (122).

BRIEF DESCRIPTION OF THE DRAWINGS

Embodiments of the teachings of the present disclosure are explained in the following with reference to the drawings, wherein.

Figure 1:
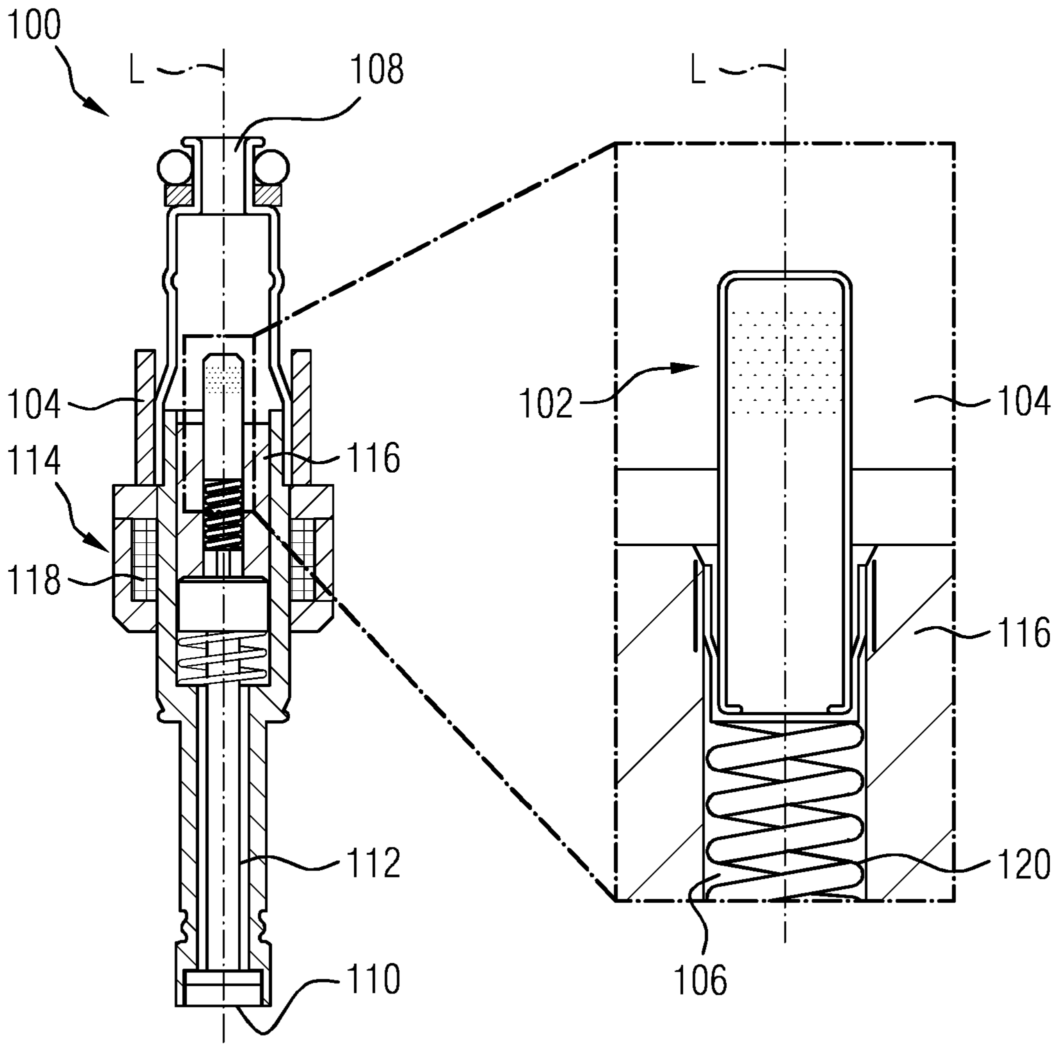
FIG. 1 illustrates a cross-section section view of a fluid injection valve with an adjusting fuel filter incorporating teachings of the present disclosure.

Elements of the same design and function that appear in different figures are identified by the same reference sign.

DETAILED DESCRIPTION

The teachings of the present disclosure include adjusting filters for a fluid injector valve, which may be a fuel injector valve for an internal combustion engine. In some embodiments, the adjusting filter comprises an elongate filter sleeve having an inlet and an outlet. The filter sleeve is shaped to provide three sections, namely a filter accepting section having the inlet, a press-fit section and centring section having the outlet and spring engaging surface surrounding the outlet. The press-fit section is arranged between the filter accepting section and the centring section. The adjusting filter also includes a filter insert arranged in the filter accepting section of the filter sleeve. The filter accepting section and the centring section has an outer diameter that is smaller than an outer diameter of the press-fit section.

In some embodiments, the elongate filter sleeve may be generally cylindrical and has three sections having a wall that extends substantially parallel to a longitudinal axis of the cylinder. The three sections have differing outer diameters and inner diameters and are formed integrally in the filter sleeve. The wall thickness of the filter sleeve may be substantially the same throughout its length. The spring engaging surface may extend radially from the wall defining the centring section towards the longitudinal axis and may be substantially perpendicular to the longitudinal axis. The spring engaging surface forms a base to the adjusting filter and includes an opening that is aligned with the longitudinal axis that provides the fuel outlet.

In some embodiments, the central press-fit section of the filter sleeve has an outer diameter which is greater than the outer diameter of both of the adjoining sections of the filter sleeve, namely the filter accepting section and the centring section. This shape enables the centring section to perform its function of axially aligning the adjusting filter within the fuel injector valve such that when the press-fit section is engaged by a press-fit connection to the fuel injector valve, the filter is more accurately axially aligned. This enables the adjusting filter to provide a good filtering and the precise tension to the spring which engages the spring engaging surface of the centring section, whilst also being simple to insert into the fluid injector valve. The narrower upper filter accepting section also assists in the correct axial positioning of the adjusting filter in the fuel injector valve and simplifies the assembly of the filter in the injector valve.

In some embodiments, the shape of the filter sleeve enables the filter sleeve to be fabricated by deep drawing and enables the filter sleeve to be formed with accurate dimensions from a single piece. The three sections of the filter sleeve are, therefore, integral. In this way, the filter sleeve may at the same time mechanically robust and cost-efficiently and precisely manufacturable.

In some embodiments, to put it differently, the filter sleeve is in particular a one pieced part—in particular deep-drawn—metal part. The expression "one-pieced" means in the present context that the filter sleeve is not assembled from a plurality of parts which are connected to one another during the manufacturing process of the filter sleeve. Rather, the filter sleeve is a single workpiece or made from a single workpiece.

In some embodiments, the filter accepting section is joined to the press-fit section by a shoulder extending radially outwards from the longitudinal axis of the elongate filter sleeve towards the press-fit section. The press-fit section is connected to the centring section by a shoulder that extends radially inwards towards the longitudinal axis of the filter sleeve and towards the narrower centring section.

In some embodiments, the filter insert may comprise different filtering media depending on the application. In some embodiments, the filter insert consists of metal. In some embodiments, the adjusting filter, in its entirety, is made of one or more metals and/or alloys. In some embodiments, the adjusting filter consists of the filter sleeve and the filter insert, both of which are metal parts, i.e. consist of one or more metals and/or alloys. In this case, it is in particular free of any plastic parts. In this way, the risk of failure, in particular at high fuel pressures, may be particularly small.

In some embodiments, the filter insert comprises mesh, such as metal mesh, for example stainless steel mesh. The mesh size of the mesh may be described by numbers of holes per inch with a finer mesh having more holes per inch and, therefore, smaller holes. The metal mesh may have a mesh size of between 100 to 500 holes per inch, for example.

In some embodiments, the filter insert includes two or more metal mesh layers having different mesh sizes to improve the filtering of particles of different sizes from the fluid and to prevent or at least slow down clogging of the filter. In some embodiments, the filter insert comprises at least one metal mesh layer comprising the first mesh size and at least one metal mesh layer comprising a second mesh size, whereby the second mesh size is smaller than the first mesh size. Mesh layers of different mesh sizes may be used to provide filtering for different size particles. For example, a metal mesh layer with larger openings may be positioned in the filter insert and in the filter sleeve upstream of a metal mesh layer having smaller openings so that the large particles are removed first by the metal mesh layer and any remaining small particles are removed from the fluid by the second metal mesh layer.

In some embodiments, the mesh size can be selected so as to have a dampening effect on pressure fluctuations in the fluid passing through the injector valve and filter. In some embodiments, the mesh size and the diameter of the wires forming the mesh is selected to increase the mechanical strength of the mesh and of the filter insert.

In some embodiments, the filter insert comprises a filtering mesh positioned between first and second protective meshes. The filtering mesh has a smaller mesh size than the mesh size of the first and second protective meshes. In these embodiments, the first and second protective meshes may have a mesh size suitable for dampening pressure fluctuations in the fluid. In some embodiments, the protective meshes may not have a significant filtering effect, but also provide a mechanical strengthen effect. The filtering mesh has a mesh size suitable for filtering, for example 200 to 500 holes per inch.

This sandwich structure of three meshes may also be used to increase the mechanical strength of the filtering mesh and, consequently, the filter insert and may be used to simplify insertion of the filter insert in the filter sleeve. For example, the first and second protective meshes may have meshes including wires defining the holes suitable having a larger diameter and a higher mechanical strength than the filtering mesh and provide mechanical support for the finer filtering mesh positioned between them.

In some embodiments, more than three meshes are provided. The stack of meshes may include protective meshes and filtering meshes, whereby the filtering meshes alternate with the protective meshes.

In other embodiments, the filter insert may comprise a porous material, such as a portion metal, for example a metal sponge, or may include compacted wire.

The filter insert may be engaged with an inner surface of the filter accepting section of the filter sleeve by a press fit. In some embodiments, one or more protrusions are positioned on the inner surface of the filter accepting section of the filter sleeve for engaging with the filter insert. For example, the filter insert may be engaged with the inner surface of the filter accepting section by a press-fit connection between the filter insert and the protrusions. Such embodiments are particularly suitable for a filter insert comprising one or more metal mesh layers as the peripheral rim of the metal mesh filter insert can be pressed onto the protrusions to press fit the filter insert into the volume defined by the inner surface of the filter accepting section.

In other embodiments, the filter insert may be welded to an inner surface of the filter accepting section.

In some embodiments, the filter sleeve and the filter insert may be made of a material which is compatible with the fluid which is injected by the fluid injector valve. In embodiments in which the fluid is fuel, such as gasoline or diesel, the filter sleeve and the filter insert may be made of stainless steel. For example, the metal mesh may be stainless steel mesh.

In some embodiments, the relationship between the length of the press-fit section and the centring section of the filter sleeve is selected so as to further improve the axial alignment of the adjusting filter in the fuel injector valve. In some embodiments, the press-fit section has a length $L_1$ none the centring section has a length $L_2$. $L_2$ can vary between half the length of $L_1$ and the length of $L_1$, i.e. $L_1/2 \leq L_2 \leq L_1$.

In some embodiments, there is a fluid injector valve comprising the adjusting fluid filter according to any one of the embodiments described herein. In some embodiments, the fluid injector valve is a fuel injector valve and the adjusting fluid filter is an adjusting fuel filter.

In some embodiments, the fluid injector valve further comprises a valve body, a valve needle and an actuator assembly for actuating the valve needle. At least the part of the press-fit section of the filter sleeve is engaged with the inner surface of the valve body by a press-fit connection in order to engage the adjusting filter in the fluid path of the fluid injection valve, in particular upstream of the valve needle and injector nozzle.

In some embodiments, the actuator assembly comprises an electromagnetic actuator which includes a magnetic pole piece and an energiser coil. The press-fit section of the filter sleeve may be engaged with an inner surface of the pole piece by a press-fit connection.

In some embodiments, the fluid injector valve further comprises a calibration spring. One end of the calibration spring is in contact with the spring engaging surface of the filter sleeve. The spring engaging surface of the filter sleeve is substantially perpendicular to the longitudinal axis of the filter sleeve and provides a horizontal surface for engaging with the spring. The spring may have an inner diameter which is larger than the diameter of the fuel outlet and an outer diameter which is smaller than the outer diameter of the spring engaging surface. In some embodiments, the angle of the shoulder between the spring engaging surface and the outer wall of the centring section is selected to avoid the transmission of mechanical force from the calibration spring along the outer wall of the filter sleeve to the filter insert, in order to avoid mechanical stress and possible damage to the filter insert.

In some embodiments, there is a filter insert for an adjusting filter for a fluid injector valve. The filter insert comprises a filtering mesh positioned between first and second protective meshes, the filtering mesh having smaller openings than the first and second protective meshes. The first and second protective meshes and the filtering mesh may comprise stainless steel and may be joined at the periphery to form a filter insert that can be more easily inserted into an adjusting fluid filter. The filtering mesh may have a mesh size of 400 to 600 holes per inch and the first and second protective meshes may have a mesh size of 100 to 200 holes per inch.

FIG. 1 illustrates a cross-sectional view and enlarged view of an exemplary fluid injection valve 100 with an exemplary adjusting filter 102. The fluid injection valve 100 is in particular suitable for dosing fuel into an internal combustion engine of a vehicle, i.e. it is a fuel injection valve. The fuel injection valve 100 comprises a valve body 104 with a central longitudinal axis L. The fuel injection valve 100 has an interior cavity 106 extending along the longitudinal axis L from a fuel inlet 108 to a fuel outlet 110. The interior cavity 106 hydraulically connects the fuel inlet 108 to the fuel outlet 110.

The fuel injection valve 100 comprises a valve needle 112 that can be actuated by an electromagnetic actuator 114. The valve needle 112 is arranged within the valve body 104 in the interior cavity 106. The valve needle 112 is arranged along the longitudinal axis L of the injection valve 100 and is movable within the valve body 104 along the longitudinal axis L by operation of the electromagnetic actuator. The valve needle 112 can be moved along the longitudinal axis L to prevent a fuel flow through a fuel outlet 110 in a closed position and to release the fuel flow through the fuel outlet 110 in further open positions.

The electromagnetic actuator 114 includes a magnetic pole piece 116 and a coil 118 which is energizable. The pole piece 116 is positionally fixed with respect to the valve body 104. The interior cavity 106 is defined at least by the valve body 104 and the pole piece 116. In some embodiments, the pole piece 116 can be in one piece with the valve body 104. The filter 102 is at least partly arranged in the pole piece 116. The longitudinal axis L of the injection valve 100 is aligned with the longitudinal axis of the filter 102.

In operation, fuel is provided by a fuel pump, for example via a fuel rail to the fuel inlet 108 of the fuel injection valve 100 and enters the interior cavity 106. From the fuel inlet 106, the fuel flow enters the adjusting filter 102 which filters the incoming fuel as it passes through the filter 102. After passing through the filter 102, the fuel flows further through the interior cavity 106. When the valve needle 112 is displaced away from the closing position, fuel may leave the injection valve 100 through the fuel outlet 110.

The adjusting filter 102 serves to filter incoming fuel and also to cooperate with the calibration spring 120 that is arranged between the adjusting filter 102 and the valve needle 112. The calibration spring 120 is mechanically coupled to the valve needle 112 and to the adjusting filter 102 to exert a force onto the valve needle 112 in the direction of the longitudinal axis L.

When manufacturing the injection valve 100, a calibration procedure is performed in which the adjusting fuel filter 102 is axially moved along the longitudinal axis L of the injector valve 100 in order to exert a force onto the calibration spring 120 and the valve needle 112 in the direction of the longitudinal axis L. This is to preload the spring 120 with a desired amount of spring force. Thus, the maximum amount of needle lift of the valve needle 112 can be more precisely calibrated and the force balance between the electromagnetic actuator and the calibration spring to be calibrated.

Figure 2A:
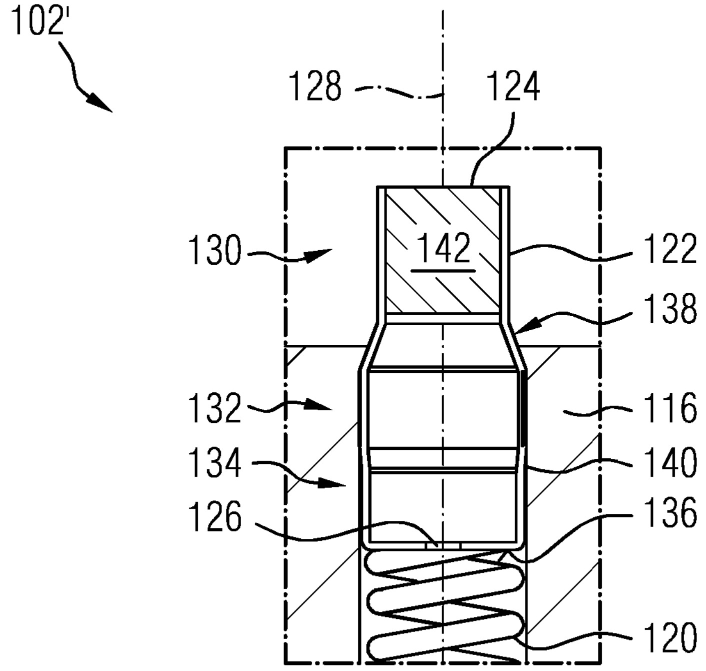
FIG. 2*a* illustrates a cross-sectional view of a fluid injection valve with an adjusting fuel filter incorporating teachings of the present disclosure.
Figure 2B:
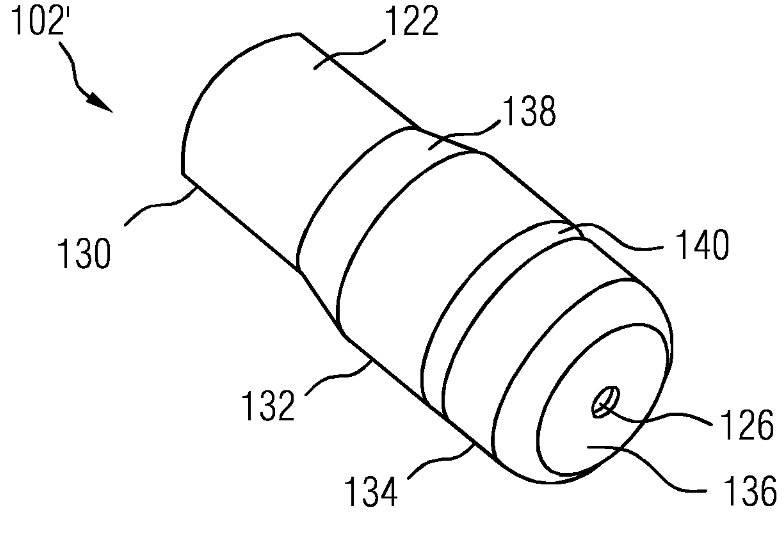
FIG. 2*b* illustrates a three-dimensional perspective view of the filter sleeve of the adjusting fuel filter of FIG. 2*a;*

FIG. 2*a* illustrates a cross-sectional and FIG. 2*b* illustrates a three-dimensional perspective view of an adjusting fuel filter 102' incorporating teachings of the present disclosure. The adjusting filter 102' may be used in a fluid injector valve such as the fuel injector valve 100 illustrated in FIG. 1.

The adjusting filter 102' comprises an elongate filter sleeve 122 which has an inlet 124 and an outlet 126. The filter sleeve 122 has a substantially cylindrical form having a longitudinal axis 128. The filter sleeve 122 is shaped to provide three sections that are concentrically arranged with respect to the longitudinal axis 128. The filter sleeve 122 includes a filter accepting section 130 which includes the inlet 124, a press-fit section 132 which forms a press-fit connection with the valve body 104 of the injector valve 100 and a centring section 134 which has the outlet 126 and a spring engaging surface 136 which extends substantially perpendicular to the longitudinal axis 128. The press-fit section 132 is arranged between the filter accepting section 130 and the centring section 134. The press-fit section 130 of the filter sleeve 122 has an outer diameter which is greater than an outer diameter of both the filter accepting section 130 and the centring section 134. The outer diameter of the centring section 134 and the filter accepting section 130 may differ from one another. In some embodiments, such as that illustrated in FIGS. 2 and 3, the filter accepting section 130 has a smaller outer diameter than the centring section 130 and the press-fit section 132.

The filter sleeve 122 includes a first shoulder 138 which extends between the filter accepting section 130 and the press-fit section 132 radially from the longitudinal axis 128. The filter sleeve 122 includes a second shoulder 140 which extends radially from the press-fit section 130 to the centring section 134. The spring engaging surface 136 is in contact with the spring.

The filter sleeve 122 is shaped, for example by deep drawing, to provide the three sections 130, 132 and 134 that are formed integrally in the filter sleeve 122. The three sections 130, 132, 134 are arranged concentrically with the respect to the longitudinal axis 128 and are defined by a wall that extends substantially parallel to a longitudinal axis 128. The three sections 130, 132, 134 have differing outer diameters and inner diameters. The wall thickness of the filter sleeve 122 may be substantially the same throughout its length.

The press-fit section 132 has a length $L_1$ and the centring section 134 has a length $L_2$, which are elected so as to increase the axial alignment of the filter sleeve with the longitudinal axis L of the fuel injector valve 100. In some embodiments, $L_1/2 \leq L_2 \leq L_1$.

The shape of the filter sleeve 122 enables the centring section 134 to perform its function of accurately axially aligning the adjusting filter 102' within the fuel injector valve such that when the press-fit section 132 is engaged by a press-fit connection to the fuel injector valve 100, the filter 102' is more accurately axially aligned with the longitudinal axis L of the fuel injector valve 100. This enables the adjusting filter 102' to provide a good filtering and the precise tension to the calibration spring 120 which engages the spring engaging surface 136 of the centring section 134 and be simple to insert into the fluid injector valve 100. The narrower upper filter accepting section 130 also assists in the correct axial positioning of the adjusting filter 102' in the fuel injector valve 100 and simplifies the assembly of the adjusting filter 102 in the injector valve 100.

The adjusting filter 102 also includes a filter insert 142 including a filter for filtering the fuel. The filter insert is positioned in the filter accepting section 130 upstream of the press-fit section 132. The filter insert 142 may include a porous metal, such as metal sponge or compacted wire. In some embodiments, the filter insert 142 includes a metal mesh and, in some embodiments, two or more layers of metal mesh which may have differing mesh sizes.

Figure 3A:
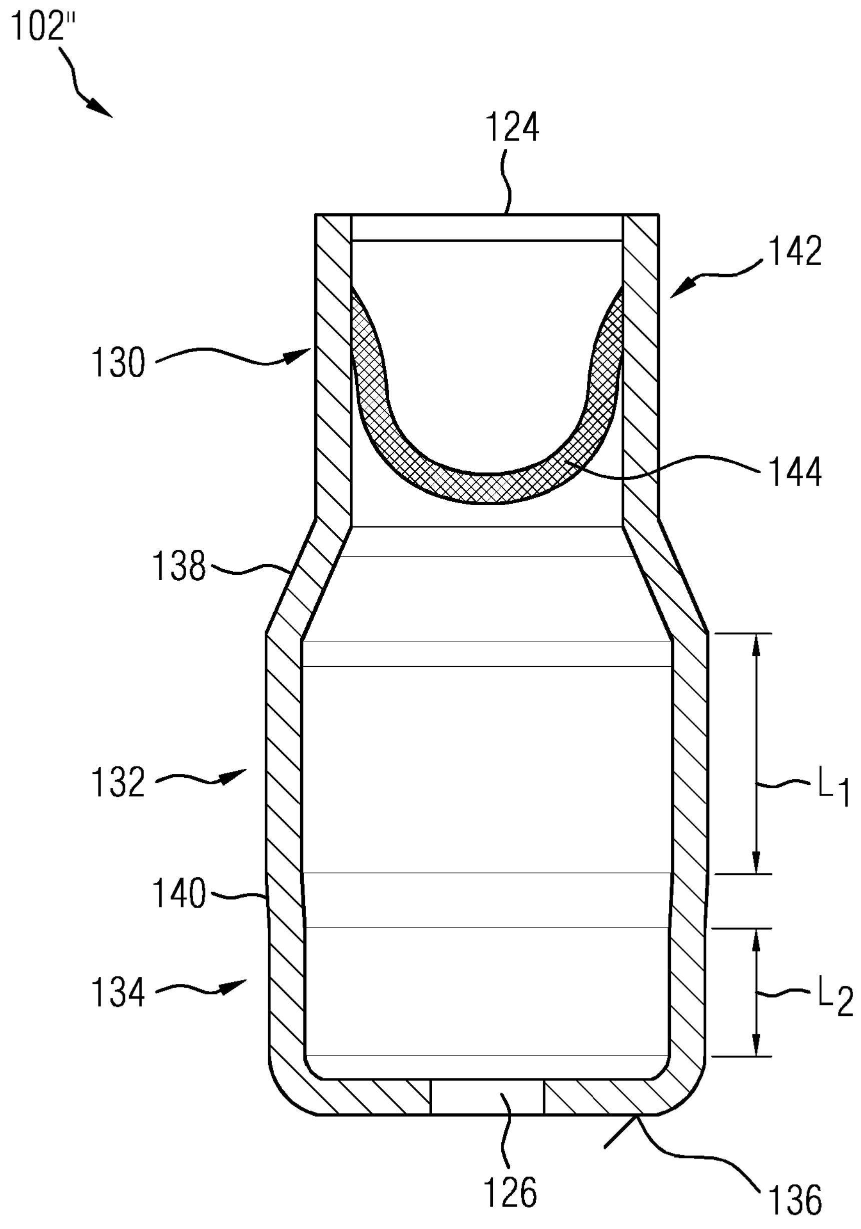
FIG. 3*a* illustrates a cross-sectional view of a fluid injection valve with an adjusting fuel filter incorporating teachings of the present disclosure.

FIG. 3*a* include illustrates an adjusting filter 102" incorporating teachings of the present disclosure, which includes the filter sleeve 122 shaped to provide the three sections 130, 132, 134 as illustrated in FIGS. 2*a* and 2*b*. The adjusting filter 102" differs in the form of the filter insert 142. In the embodiment shown, the filter insert 142 includes a metal mesh filter 144 which, as illustrated in FIG. 3*c*, includes three mesh layers. The mesh filter 144 is positioned within the filter accepting portion 130 and is engaged with the inner sidewall 146 of the filter sleeve 122. The mesh filter 144 is engaged with the inner sidewall 146 of the filter sleeve 122 in the filter accepting portion 130 by a press-fit connection to secure the mesh filter 144 in the adjusting filter 102".

Figure 3B:
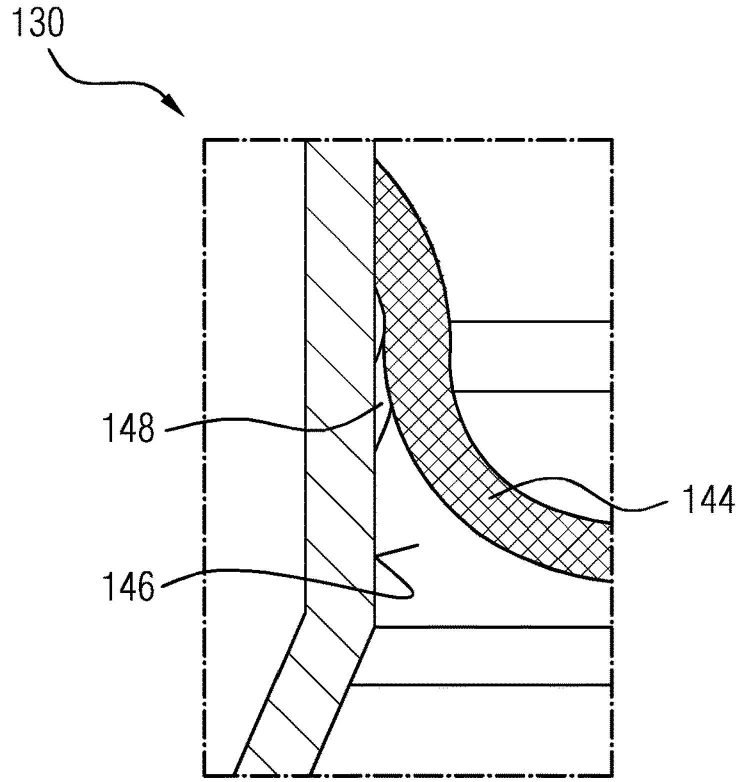
FIG. 3*b* illustrates an enlarged cross-sectional view of the connection press-fit connection between the filter insert and the filter sleeve of FIG. 3*a*.
Figure 3C:
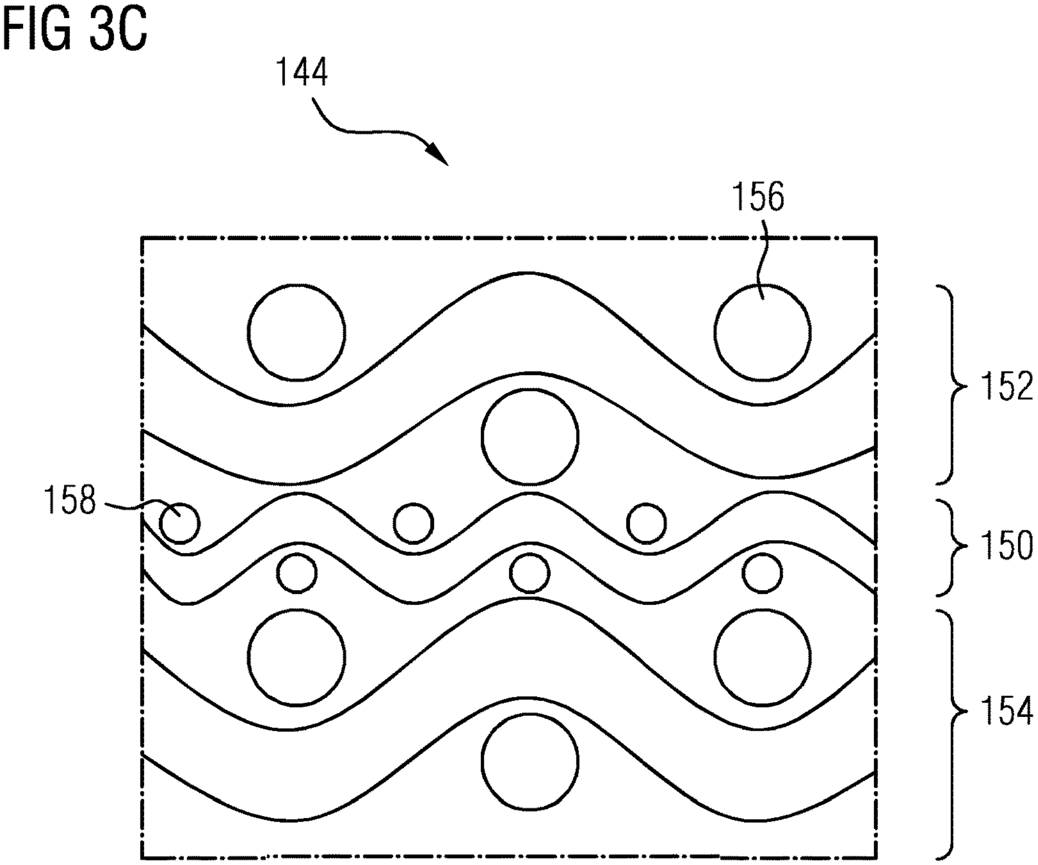
FIG. 3*c* illustrates a cross-sectional view of a mesh filter insert incorporating teachings of the present disclosure.

As is illustrated in FIG. 3*b*, the mesh filter 144 may be engaged with protrusions 148 which protrude radially inwards from the inner sidewall 146 of the filter sleeve 122. The periphery of the mesh filter 144 can be mechanically engaged with the protrusions by pressing the metal mesh 144 and, in particular, the periphery of the mesh filter 144 onto the protrusions 148 after insertion of the mesh filter 144 through the fuel inlet 124. In the inserted position, the periphery of the metal mesh 144 may have an undulating form with the peaks positioned above the protrusions 148 and valleys positioned between the protrusions 148.

The mesh filter 144 may include two or more mesh layers which may have differing mesh sizes. The mesh size may lie in the range of 200 to 500 holes per inch. A layer of mesh with a smaller hole size can be used to increase the filtering capacity of the filter and to remove smaller particles than that possible with a mesh having a larger hole size.

In the embodiment illustrated in FIG. 3*c*, the mesh filter 144 includes three mesh layers, a central filtering mesh layer 150 and two outer protective mesh layers 152, 154. The mesh layers may be joined at the periphery to form a single unit. The protective mesh layers 152, 154 may have a larger mesh size than the filtering mesh layer 150. The protective mesh layers 152, 154 may provide structural support for the filtering mesh layer 150 and may also have a mesh size selected to provide a dampening function. In some embodiments, the filtering mesh layer 150 may have a mesh size of around 400 to 600 holes per inch, for example 500 holes per inch and the protective mesh layers 152 and 154 may have a mesh size of around 100 to 200 holes per inch.

As can be seen in the cross-sectional view of FIG. 3*c*, adjacent layers of mesh 150, 152, 154 are offset with respect to one another. For example, the wires 156 of the filtering mesh layer 150 that extend into the plane of the drawing are arranged between and, optionally, at an angle inclined angle to the wires 158 of the adjacent protective mesh layers 152, 154 which extend into the plane of the drawing.

In some embodiments, the mesh filter 144 may include more than three layers. In some embodiments, the holes of the mesh layers are increasingly smaller in the direction of fluid flow, i.e. from the inlet 124 to the outlet 126 so as to filter increasingly smaller particles from the fluid in the direction of fluid flow.

In some embodiments, the filter insert 144 also has dampening properties. Pressure pulsations and drops of pressure of the fuel when the fuel is passing through is reduced and minimized significantly due to the layer or layers of mesh with the larger mesh size. This can assist in improving the spray pattern or distribution of fuel in the fuel injected into the combustion chamber and reduce fuel consumption and/or improve combustion efficiency.

What is claimed is:

1. An adjusting filter for a fluid injector valve, the filter comprising:

an elongate filter sleeve comprising a hollow cylinder having an inlet and an outlet;

wherein an external radial portion of the filter sleeve includes a filter accepting section surrounding the inlet, a press-fit section, a centring section surrounding the outlet, and an axial end portion of the filter sleeve includes a rounded corner and an extended disk spring engaging surface surrounding the outlet;

wherein the press-fit section is arranged between the filter accepting section and the centring section; and a filter insert arranged in the filter accepting section;

wherein the filter accepting section, the press-fit section, and the centring section share an integrated outer wall with a substantially constant thickness;

wherein the filter accepting section has an outer diameter smaller than an outer diameter of the press-fit section; and wherein the centring section has an outer diameter smaller than the outer diameter of the press-fit section.

2. The adjusting filter of claim 1, wherein the filter insert comprises metal mesh.

3. The adjusting filter of claim 2, wherein the filter insert comprises at least one metal mesh layer comprising a first mesh size and at least one metal mesh layer comprising a second mesh size, the second mesh size being smaller than the first mesh size.

4. The adjusting filter of claim 2, wherein the filter insert comprises a filtering mesh positioned between first and second protective meshes, the filtering mesh having smaller openings than the first and second protective meshes.

5. The adjusting filter of claim 1, wherein the filter comprises porous metal, metal sponge or compacted wire.

6. The adjusting filter of claim 1, wherein the filter insert is engaged with an inner surface of the filter accepting section by a press-fit connection.

7. The adjusting filter of claim 1, further comprising one or more protrusions on an inner surface of the filter accepting section of the filter sleeve.

8. The adjusting filter of claim 7, wherein the filter insert is engaged with the inner surface of the filter accepting section by a press-fit connection between the filter insert and the one or more protrusions.

9. The adjusting filter of claim 1, wherein the filter insert is welded to an inner surface of the filter accepting section.

10. The adjusting filter of claim 1, wherein the filter sleeve and the filter insert is made of stainless steel.

11. The adjusting filter of claim 1, wherein the press-fit section has a length $L_1$ and the centring section has a length $L_2$, wherein $L_1/2 \leq L_2 \leq L_1$.

12. A fluid injector valve comprising:

a valve body;

an elongate filter sleeve comprising a hollow cylinder having an inlet and an outlet;

wherein an external radial portion of the filter sleeve includes a filter accepting section surrounding the inlet, a press-fit section, a centring section surrounding the outlet, and an axial end portion of the filter sleeve includes a rounded corner and an extended disk spring engaging surface surrounding the outlet;

wherein the press-fit section is arranged between the filter accepting section and the centring section; and a filter insert arranged in the filter accepting section;

wherein the filter accepting section, the press-fit section, and the centring section share an integrated outer wall with a substantially constant thickness;

wherein the filter accepting section has an outer diameter smaller than an outer diameter of the press-fit section; and wherein the centring section has an outer diameter smaller than the outer diameter of the press-fit section;

wherein the press-fit section is press-fit into the valve body.

13. The fluid injector valve of claim 12, further comprising:

a valve needle; and an actuator assembly for actuating the valve needle;

wherein at least a part of the press-fit section of the filter sleeve is engaged with the inner surface of the valve body by a press-fit connection.

14. The fluid injector valve of claim 13, wherein the actuator assembly comprises an electromagnetic actuator comprising a magnetic pole piece and an energizable coil, wherein the press-fit section of the filter sleeve is engaged with an inner surface of the pole piece by a press-fit connection.

15. The fluid injector valve of claim 12, further comprising a calibration spring, wherein one end of the calibration spring is in contact with the spring-engaging surface of the filter sleeve.

* * * * *